(12) United States Patent
Blinn et al.

(10) Patent No.: US 11,128,476 B2
(45) Date of Patent: Sep. 21, 2021

(54) DNS PROVIDER CONFIGURING A REGISTRY DNSSEC RECORD

(71) Applicant: Go Daddy Operating Company, LLC, Scottsdale, AZ (US)

(72) Inventors: Arnold Neil Blinn, Hunts Point, WA (US); Christopher Ambler, Palo Alto, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 1021 days.

(21) Appl. No.: 15/078,912

(22) Filed: Mar. 23, 2016

(65) Prior Publication Data
US 2017/0279617 A1    Sep. 28, 2017

(51) Int. Cl.
*H04L 29/06* (2006.01)
*H04L 9/32* (2006.01)
*H04L 29/12* (2006.01)

(52) U.S. Cl.
CPC .......... *H04L 9/3263* (2013.01); *H04L 9/3247* (2013.01); *H04L 61/1511* (2013.01); *H04L 63/06* (2013.01)

(58) Field of Classification Search
CPC ............. H04L 63/0823; H04L 63/0428; H04L 63/0308
USPC ........................................................ 713/155
See application file for complete search history.

(56) References Cited

FOREIGN PATENT DOCUMENTS

CA    2775560 A1 * 10/2012    ........... H04L 63/123

OTHER PUBLICATIONS

Kumari, et al., "Automating DNSSEC Delegation Trust Maintenance," [online], Sep. 2014, retrieved on Mar. 14, 2016. Retrieved from <https://tools.ietf.org/html/rfc7344>.
Latour, et al., "Third Party DNS operator to Registrars/Registries Protocol", [online], Feb. 12, 2016, retrieved on Mar. 14, 2016. Retrieved from <https://tools.ietf.org/html/draft-latour-dnsoperator-to-rrr-protocol-02>.

* cited by examiner

*Primary Examiner* — Evans Desrosiers
(74) *Attorney, Agent, or Firm* — Greenberg Traurig, LLP

(57) ABSTRACT

A Domain Name System (DNS) provider that is not a registrar of a domain name may nonetheless request a registry (possibly via an API request from the registrar to the registry, or via a call directly to the registry) to alter a Delegation Signer (DS) record in a DNS parent zone or other data controlled by the registry. The registry preferably confirms that the DNS provider has control over a nameserver for the domain name. Using Public Key Infrastructure (PKI), the DNS provider may sign the request with a private key and store the public key in a location that confirms the DNS provider has control over the domain name or over the nameservers for the domain name. After successfully confirming the DNS provider, the registrar or registry may change the DS record so that the domain name supports Domain Name System Security Extensions (DNSSEC) or update other data with the registry.

20 Claims, 5 Drawing Sheets

DNS PROVIDER CONFIGURING A REGISTRY DNSSEC RECORD

FIELD OF THE INVENTION

A method that allows a Domain Name System (DNS) provider to enable a domain name not registered by the DNS provider to support Domain Name System Security Extensions (DNSSEC) by configuring the Delegation Signer (DS) record, Nameserver Records (NS), or other data in a DNS parent zone controlled by a registry.

SUMMARY OF THE INVENTION

The invention allows a Domain Name System (DNS) provider that is not the registrar of a domain name to update a Delegation Signer (DS) record, a Nameserver record, or other data stored in a DNS parent zone or at a registry. A DS record is needed to enable the domain name to support Domain Name System Security Extensions (DNSSEC).

The process may start with a registrar registering a domain name to a registrant. The registrant may select and use a DNS provider that is not the registrar to manage DNS traffic of the domain name. The DNS provider may store the domain name and a zone in a nameserver controlled by the DNS provider.

The DNS provider may, preferably via a certificate authority (CA) or the registrar, obtain a public key and a private key (a key pair) that are used only for that domain name. The DNS provider may further obtain a plurality of other key pairs for a corresponding plurality of other domain names being managed by the DNS provider.

The DNS provider may sign and/or encrypt with the private key for the domain name a request to update a DS record in a DNS parent zone controlled by a registry to thereby enable the domain name to support DNSSEC.

The DNS provider may transmit, possibly via an Application Programming Interface (API), the signed request to the either the registrar or the registry. The receiving party, either the registrar or the registry may then verify with a public key for the domain name the signed request. The receiving party, either the registrar or the registry, may verify that the signed request was signed by the private key for the domain name. As non-limiting examples, the public key for the signed request may live in either a well known record in the nameserver for the domain, or in the DNS Zone for the domain.

If the registry or the registrar was able to verify the signed request was in fact signed by the private key for the domain name, the registry may update the DS record in the DNS parent zone to thereby enable the domain name to support DNSSEC. The registry may do this directly; the registrar may call the registry to apply the change.

The above features and advantages of the present invention will be better understood from the following detailed description taken in conjunction with the accompanying drawings.

DETAILED DESCRIPTION

Figure 1:
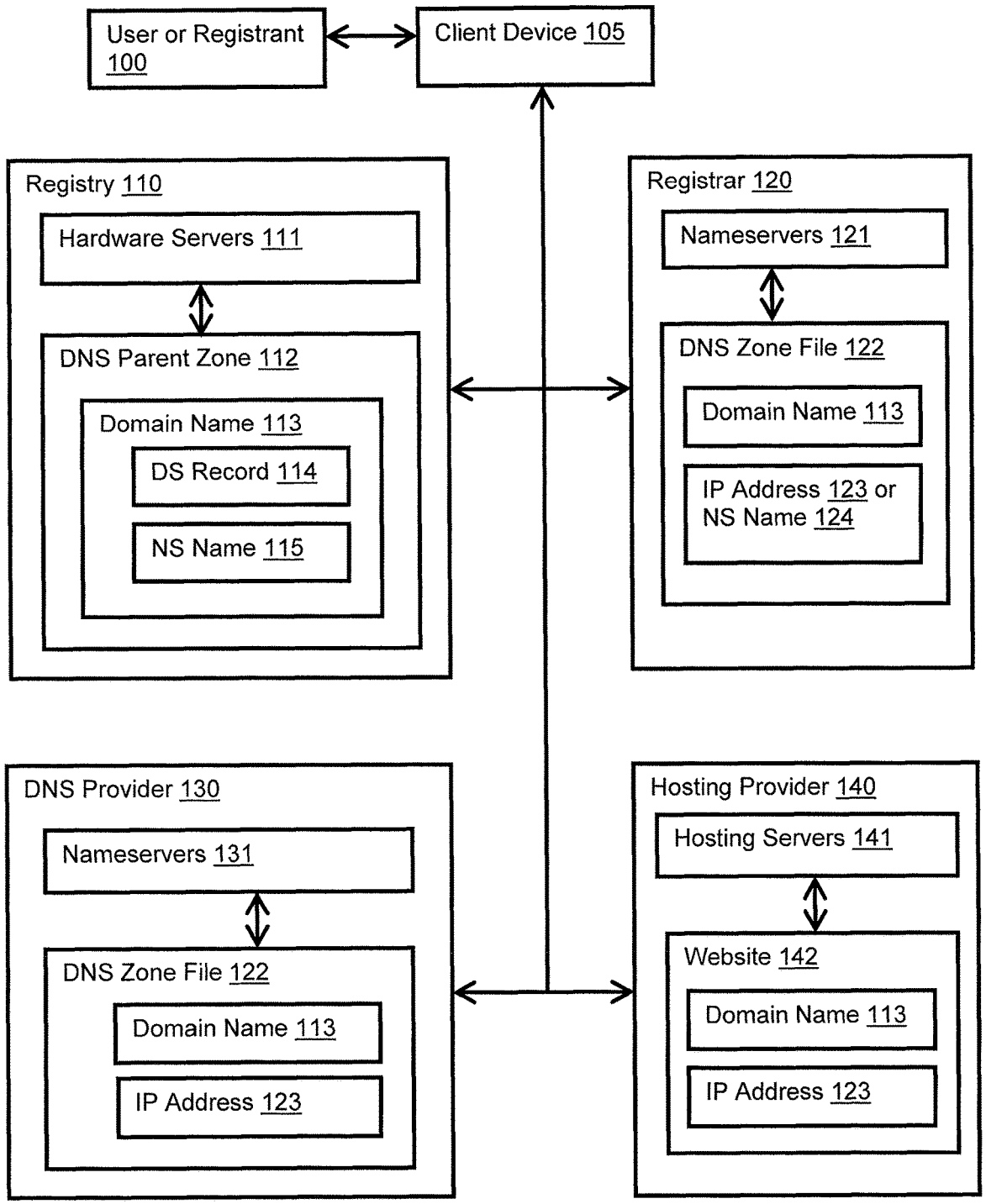
FIG. 1 is a block diagram of a system that may be used to allow a Domain Name System (DNS) provider to enable a domain name to support Domain Name System Security Extensions (DNSSEC).

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system that may be used to allow a Domain Name System (DNS) provider 130 to enable a domain name 113 to support Domain Name System Security Extensions (DNSSEC). While FIG. 1 only illustrates a single client device 105, a single registry 110, a single registrar 120, a single DNS provider 130 and a single hosting provider 140 to make it easier to describe the invention, it should be understood that the invention may be practice as part of a larger computer network, where any number of client devices, registries, registrars, DNS providers and hosting providers may all be interconnected.

The arrows between the client device 105, registry 110, registrar 120, DNS provider 130 and hosting provider 140 represent one or more computer networks. Communications and transmissions over the computer networks may use any currently known or developed in the future methods or protocols.

A computer network is a collection of links and nodes (e.g., multiple computers and/or other devices connected together) arranged so that information may be passed from one part of the computer network to another part of the computer network over multiple links and through various nodes. Non-limiting examples of computer networks include the Internet, a public switched telephone network, a global Telex network, an intranet, an extranet, a local-area network, a wide-area network, wired networks, wireless networks and/or cell phone networks.

The Internet is a worldwide network of hardware servers and computer networks arranged to allow for the easy and robust exchange of information between, for example, a user (who may be a domain name registrant 100 or registrant 100) using a client device 105 and one or more websites 142 hosted on one or more hosting servers 141.

Hardware servers 111, nameservers 121, 131 and hosting servers 141 are hereby defined to be physical machines. While hardware servers 111, nameservers 121, 131 and hosting servers 141 provide the hardware to run software, the hardware servers 111, nameservers 121, 131 and hosting servers 141 are hereby defined to not be merely or only software. Hardware servers 111, nameservers 121, 131 and hosting servers 141 may be, as non-limiting examples, one or more Dell PowerEdge(s) rack server(s), HP Blade Servers, IBM Rack or Tower servers, although other types of hardware servers 111 and/or combinations of other hardware servers 111 may also be used.

Hundreds of millions of Internet users around the world have access to client devices 105 connected to the Internet. A user may use a client device 105, such as, as non-limiting examples, a cell phone, PDA, tablet, laptop computer or desktop computer to access a website 142 via the Internet. Users are able to access data at specific locations on the Internet referred to as websites. Each website 142 may consist of a single webpage, but typically consist of multiple interconnected and related webpages. Websites 142 may, as a non-limiting example, be created using HyperText Markup Language (HTML) to generate a standard set of tags that define how the webpages for the website 142 are to be displayed.

Hosting providers 140 may provide the hardware, such as hosting servers 141, and infrastructure necessary to host one or more websites 142, possibly for a plurality of domain name registrants 100 who are website operators/owners. Menus, links, tabs, etc. may be used to move between different web pages within a website or to move to a different webpage on a different website. The combination of all the websites and their corresponding web pages on the Internet is generally known as the World Wide Web (WWW) or simply the Web.

Users may access websites 142 using software known as an Internet browser, such as MICROSOFT INTERNET EXPLORER, GOOGLE CHROME or MOZILLA FIREFOX. After the browser has located a desired webpage in a desired website 142, the browser requests and receives information regarding the webpage, typically in the form of an HTML document, and then displays the webpage for the user on the user's client device 105. The user then may view other webpages at the same website 142 or move to an entirely different website using the browser.

Browsers are able to locate specific websites because each website 142 has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

However, IP addresses, even in human readable notation, are difficult for users to remember and use. A domain name 113 is easier to remember and may be associated with an IP Address 123 to a website 142 on the Internet. A browser may be able to access the website 142 on the Internet through the use of the domain name 113.

Domain names are also much easier to remember and use than their corresponding IP addresses. The Internet Corporation for Assigned Names and Numbers (ICANN) and the Internet Assigned Numbers Authority (IANA) create rules and coordinate the use of over 1,000 Top-Level Domains (TLDs). Each TLD is typically assigned a single registry 110 to be an authoritative source of information (the particular data stored by the registry 110 varies depending on the TLD). One or more domain name registrars 120 may register domain names to users (domain name registrants 100 or registrants 100) on behalf of a registry 110.

The process for registering a domain name 113 with .com, .net, .org, and some other TLDs allows a user to use an ICANN-accredited domain name registrar 120 to register a domain name 113. For example, if a user, John Doe, wishes to register the domain name 113 "johndoe.com," John Doe may initially determine whether the desired domain name 113 is available by contacting a domain name registrar 120. The user or potential domain name registrant 100 may make this contact using the registrar's website and typing the desired domain name 113 into a field on a webpage of the registrar's website created for this purpose.

Upon receiving a domain name 113 or a domain name search request from the user, the registrar 120 may ascertain whether "johndoe.com" has already been registered by, as non-limiting examples, checking the shared resource system (SRS) database associated with the TLD of the domain name 113 or by checking with the authoritative registry 110 for the TLD. The results of the search may be displayed on the webpage to notify the user of the availability of the desired domain name 113.

If the desired domain name 113 is available, the user may register the domain name 113, thereby becoming the domain name registrant 100 or registrant 100 of the domain name 113. If the desired domain name is not available for registration, the registrar 120 may transmit one or more suggested domain names to the user to permit the user to select and register one or more of the suggested domain names. A domain name registrant 100 may register one or more domain names using this process.

Once a domain name 113 is registered to the registrant 100, the registrant 100 may desire to have the domain name 113 point to a website 142 owned and operated by the registrant 100. This allows a user to enter the domain name 113 into a browser and then enables the browser to access the content on the website 142 pointed to by the domain name 113. The Domain Name System (DNS) may be used by browsers to convert domain names into IP addresses of websites.

The DNS may comprise hardware servers and files that are cooperatively operated by entities (such as registries 110 and registrars 120) that are preferably geographically dispersed to minimize potential damage from natural or intentional causes. The DNS is a hierarchical distributed naming system for websites (and other resources) connected to the Internet. The DNS is also an Internet service that translates a domain name 113 into an IP Address 123 that may, for example, point to, i.e., be the address for, a website 142. As an example, a browser may transmit the domain name 113 johndoe.com to a nameserver 121 of the DNS and the nameserver 121 may translate the domain name 113 johndoe.com into the IP Address 123 of 111.222.121.123. The browser may then use this IP Address 123 to find the website 142 associated with the domain name 113 johndoe.com.

When the browser gets johndoe.com, it may first try to figure out if the browser knows the nameserver for johndoe.com. Typically it wouldn't (on first query). So the browser may then look in the nameserver for .com, which is well known and run by the registry.

In the .com zone at the registry 110 would be the nameserver for johndoe.com. Of course this is important because the nameserver may point to a DNS provider that is random. This may be done by the user updating the nameserver records for johndoe.com with the registrar 120. The registrar today is the ONLY party that can update the data at the registry.

The present invention solves this problem by giving the new owner of the nameserver a way to update OTHER data at the registry 110. As a specific example, the DNS Sec data. The invention could, in theory, be used to update the nameserver a second time (as an example, the DNS provider may want to change the nameservers to another nameserver run by the DNS provider).

As part of the DNS, each registry 110 may comprise one or more hardware servers 111 that may be used to store and manage a DNS (parent) zone for the root 112 for a TLD. The DNS root zone 112, i.e., DNS parent zone 112, may store, as non-limiting examples, a plurality of domain names (each by definition having the same TLD), where each domain name is associated with at least two nameservers (NS) records 115 and when DNS Sec is enabled a Delegation Signer (DS) record 114. Each registry 110 controls and manages the DNS parent zone 112 and, for security reasons, preferably only accepts requests from the registrar 120 of a domain name 113 to request changes to records (such as the DS record 114 or Nameserver records) associated with the domain name 113.

Managed DNS providers (DNS providers 130) are also part of the DNS. DNS providers 130 offer either a web-based control panel or downloadable software that allows registrants 100 to manage the DNS traffic for their domain name 113. As non-limiting examples of protocols, DNS providers 130 may allow registrants 100 to manage their DNS traffic using DNS Failover, Dynamic IP addresses and GeoDNS.

As part of the DNS, domain name registrars 120 (registrars 120), web hosting providers (hosting providers 140) and DNS providers 130 comprise one or more hardware servers and one or more nameservers 121, 131. Registrars 120, hosting providers 140 and DNS providers 130 may all be controlled by the same entity, all controlled by different entities or a sub-combination may be controlled by a single entity. As a non-limiting example, a single entity may be the registrar 120 of a domain name 113 and the hosting provider 140 of a website 142 pointed to by the domain name 113 while a different entity may be the DNS provider 130 to manage the DNS traffic.

Each nameserver 121, 131 also comprises one or more hardware servers that are connected to the Internet. The nameservers 121, 131 are able to translate domain names into IP addresses in response to queries from browsers or other services. Registrars 120, hosting providers 140 and DNS providers 130 may enable their customers (registrants 100, users and/or website operators) to store their domain names and associated IP addresses and data for various services in one or more nameservers 121, 131. In this manner, a domain name 113 (such as johndoe.com) registered to a registrant 100 may be translated by a nameserver 121, 131 (that is part of the DNS) into an IP Address 123. The IP Address 123 may point to a resource, such as a website 142 owned and operated by the registrant 100 of the domain name 113. A browser may receive from the nameserver 121, 131 the IP Address 123 and then the browser may use the IP Address 123 to locate a website 142 associated with the IP Address 123.

The Domain Name System Extensions (DNSSEC) may be used to provide additional security to the DNS. DNSSEC comprises Internet Engineering Task Force (IETF) specifications for securing some of the information provided by the DNS. DNSSEC comprises a set of extensions to DNS to provide DNS clients origin authentication of DNS data, authenticated denial of existence and data integrity. DNSSEC digitally signs records during the DNS lookup using public-key cryptography. The correct DNSSEC record is authenticated via a chain of trust, starting with a set of verified public keys for the DNS root zone. Registrants 100 may generate their own keys and upload them using a DNS control panel at their registrar 120, which then pushes the keys to a registry 110. The registry 110 may sign and publish the keys in the DNS. As the DNSSEC provides additional security for the DNS (and thus the domain names of the registrants 100), registrants 100 may want their domain names to take advantage of the features of DNSSEC.

DNSSEC and other parts of the present invention may use public key infrastructure (PKI). PKI associates a public key with a respective user identity using a certificate authority (CA). The CA may create, store and distribute digital certificates which are used to verify that a public key belongs to a particular entity. The particular entity also has a private key that corresponds with the public key.

The public key and private key (which may comprise very long numbers) of the PKI have several remarkable properties. First, a message encrypted by a private key can only be decrypted using the associated public key. And second, it is very difficult to discover the private key even if you know the public key. These properties allow a user to maintain the privacy of the private key while distributing the associated public key. Encrypting data for a recipient takes the public key of the recipient and obfuscates the data. Only the receiving party, with the corresponding private key, could read the message. The same technique can be used to sign the data. Here the ender uses their private key to encrypt a hash of the data. The recipient can verify the authenticity of the sender by decrypting the hash with the public key, and comparing the resulting value with the hash of the data transmitted. Encryption hides the data, signing verifies the sender. Both can be used independently or together.

Figure 2:
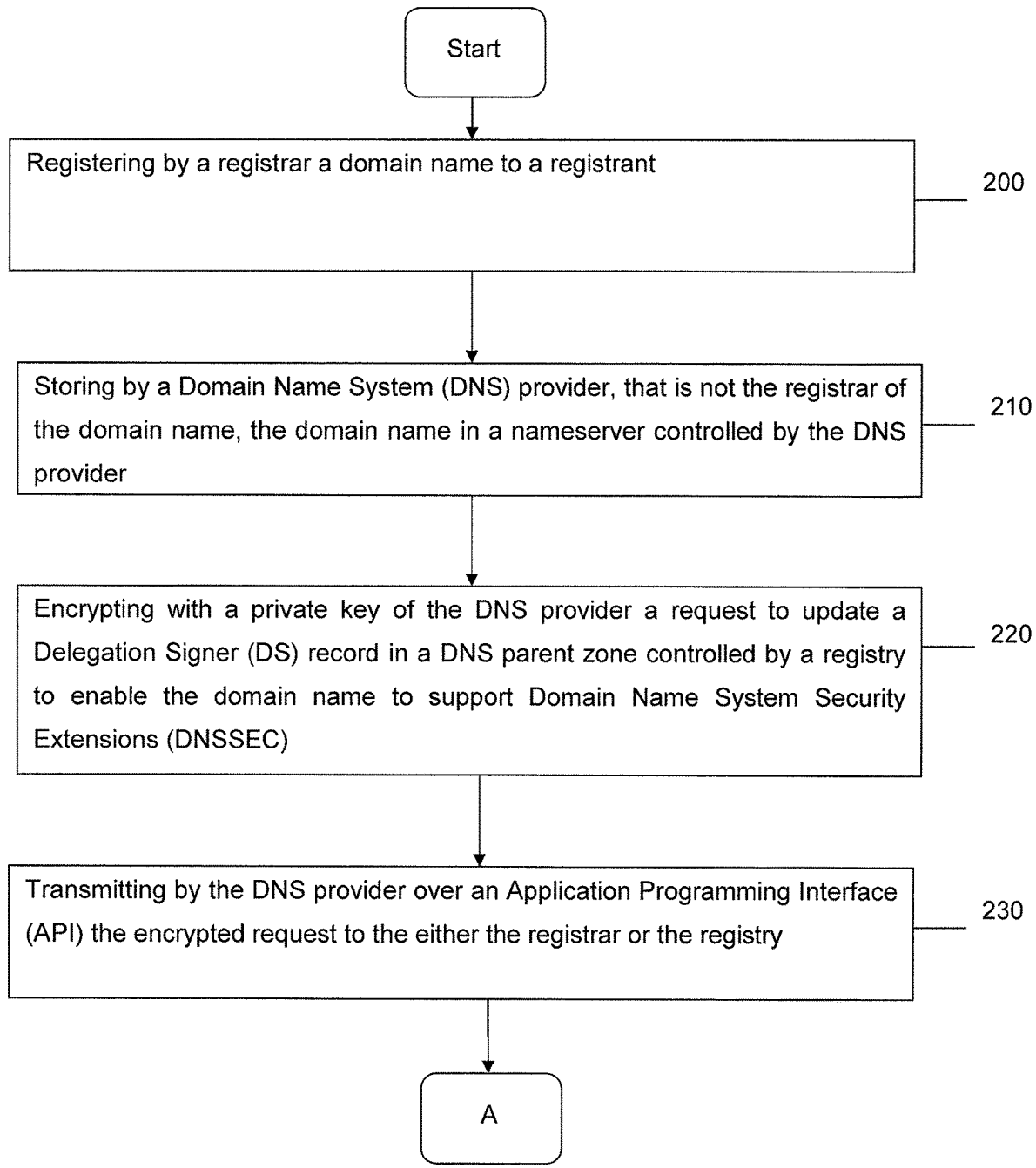
FIGS. 2-3 are flowcharts illustrating methods that may be used for a DNS provider to enable a domain name to support DNSSEC.
Figure 3:
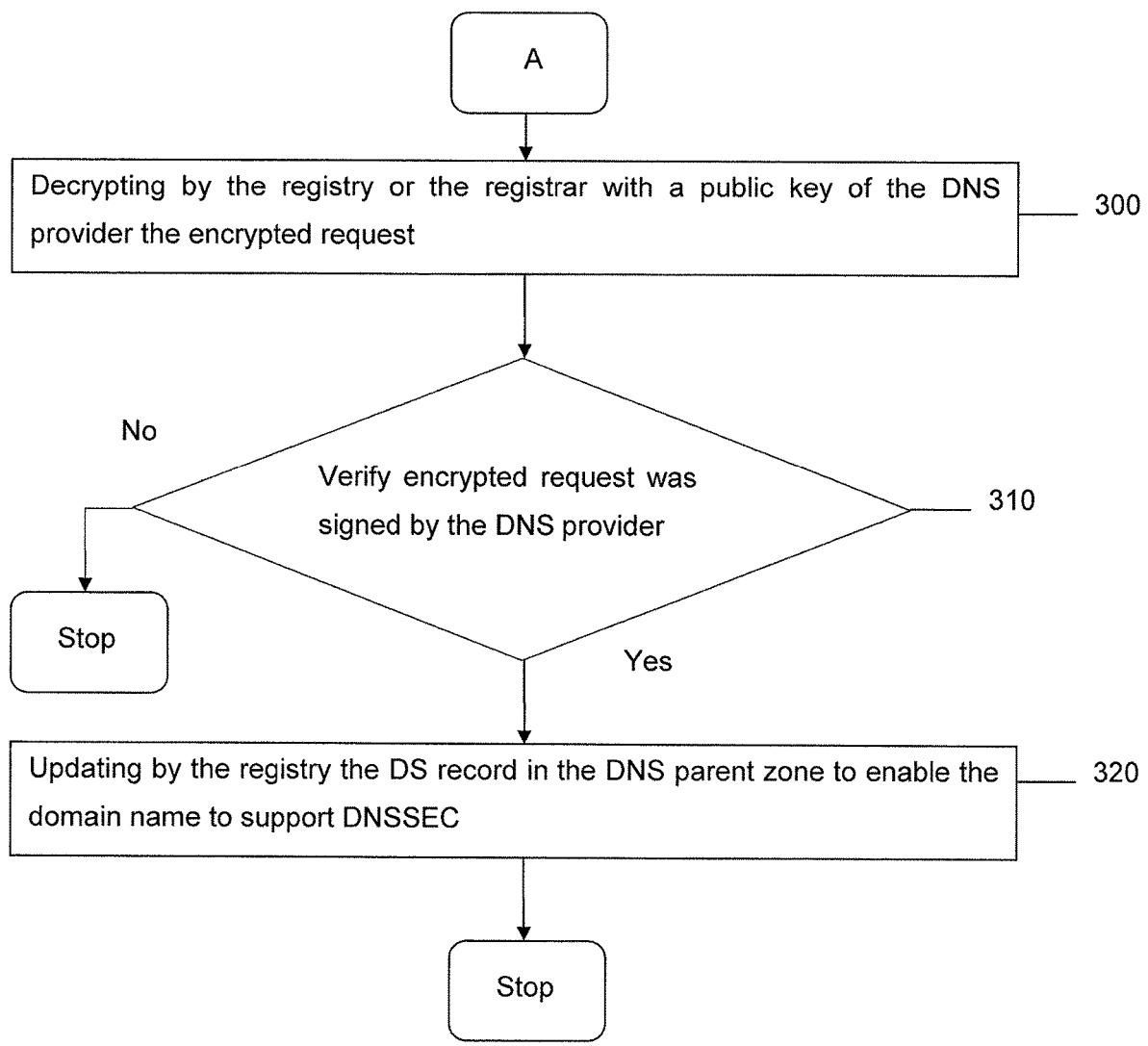

FIGS. 2-3 illustrate an embodiment of practicing the invention. A registrant 100 may register a domain name 113, such as johndoe.com, at a registrar 120. The registrar 120 may cooperate with the registry 110 authoritative for the TLD, in this case .com, to register the domain name 113 to the registrant 100. (Step 200) The registry 110 may update the DNS root zone 112 so that the domain name 113 is associated with a NS name 115 of a nameserver 121, 131 that has the IP Address 123 for the domain name 113.

As an example, the domain name 113 johndoe.com may be associated with a NS name 115 of NS19.domaincontrol.com and NS20.domaincontrol.com in the DNS parent zone 112 controlled by the registry 110. This would signify that the nameserver 121, 131 pointed to by the domain name NS19.domaincontrol.com and the nameserver 121, 131 pointed to by the domain name NS20.domaincontrol.com have the IP Address 123 (or a chained NS name 115 for another nameserver) for the domain name 113 johndoe.com. Thus, a browser may access the registry 110 for the TLD of a domain name 113 and receive a NS name 115 for the nameserver 121, 131 for the domain name 113. The browser may then access the nameserver 121, 131 to retrieve the IP Address 123 for the domain name 113.

The registrant 100 may design and operate a website 142 hosted by a hosting provider 140. The registrar 120 may control one or more nameservers 121 that manage a DNS zone file 122. The registrar 120, possibly with input from the registrant 100, may assign an IP Address 123 to the domain name 113 in the DNS zone file 122 such that the IP Address 123 points to the website 142 hosted by the hosting provider 140.

Alternatively, the registrant 100 may desire to have a DNS provider 130 that is not the registrar 120 of the domain name 113 to provide a managed DNS service for the domain name 113. The registrant 100 may switch the DNS service from the registrar 120 to the DNS provider 130. The DNS provider 130 may store the domain name 113 and the domain name's associated IP Address 123 to a website 142 in one or more nameservers 131 controlled by the DNS provider 130. (Step 210)

When the DNS service is switched from the registrar 120 to the alternative DNS provider 130, the DNS parent zone 112 at the registry 110 and the DNS zone file 122 at the registrar 120 needs to be updated to reflect that the alternative DNS provider 130 now has the nameservers 131 for the domain name 113. In a first embodiment, the DNS root zone 112 controlled by the registry 110 may include for a domain name a NS name 115 for a nameserver 131 controlled by the alternative DNS provider 130.

In a second embodiment, the DNS root zone 112 controlled by the registry 110 may include for a domain name a NS name 115 for a nameserver 121 controlled by a registrar 120 and the DNS zone file 122 controlled by the registrar 120 may include for the domain name a NS name 124 for a nameserver 131 controlled by the DNS provider 130. In either case, a browser is able to locate a nameserver 131 controlled by the DNS provider 130 for the domain name 113.

The registrant 100 of the domain name 113 may communicate a request to the DNS provider 130 to allow the domain name 113 to support DNSSEC. If the DNS provider 130 is not the registrar 120 of the domain name 113, they would be unable to update the DS records with the registry because the registry 110 may not be able to verify that the DNS provider 130 has control over the nameserver 131 for the domain name 113 and thus typically will not process a request from the DNS provider 130 to change records in the DNS root zone 112.

To solve this problem, the DNS provider 130 may use an encrypted public key method, such as, as a non-limiting example, PKI to communicate with the registrar 120 or the registry 110. The DNS provider 130 may have a public and a private key pair created, preferably by a CA, for each domain name 113 (or for the nameserver for all zones). The DNS provider 130 may create a plurality of other public and private key pairs associated with a corresponding plurality of other domain names.

The DNS provider 130 may store the public key in a location that enables the registrar 120 and/or registry 110 to confirm that the DNS provider 130 has proper authority demonstrated by control over the domain name 113. As two non-limiting examples, the public key may be stored in a DNS zone file 122 for the domain name 113 or the public key may be store in a DNS zone file 122 of the domain for the nameserver.

The DNS provider 130 may sign with the private key of the DNS provider 130 a request to update a Delegation Signer (DS) record 114 in the DNS root zone 112 controlled by the registry 110 to enable the domain name 113 to support Domain Name System Security Extensions (DNSSEC). (Step 220). The registry can verify the caller (in this case the DNS Provider) by verification of the signature using the public key. This public key could be queried in the zone of the domain or the zone of the nameserver. It would use the zone of the domain if the DNS Provider had a unique public/private key for each domain, or in the nameserver if the DNS Provider shared one public/private key for all domains they run DNS for.

The DNS provider 130 may transmit over, as a non-limiting example, an Application Programming Interface (API) the signed request to the either the registrar 120 or the registry 110. (Step 230) The registrar 120 or the registry 110 may read the public key from a location that confirms the DNS provider 130 has control over the domain name 113 or the nameserver(s) 131 for the domain name 113. As non-limiting examples, the DNS provider 130 may store and the registrar 120 or registry 110 may read the public key from the DNS zone file 122 for the domain name 113 or the DNS zone file 122 for the domain of the nameserver 131 of the DNS provider 130. The registrar 120 or the registry 110 may verify the signature of the API call with the public key of the DNS provider 130 the encrypted request. (Step 300) The registrar 120 or the registry 110 may attempt to verify that the encrypted request was signed by the private key of the DNS provider 130. (Step 310)

Figure 4:
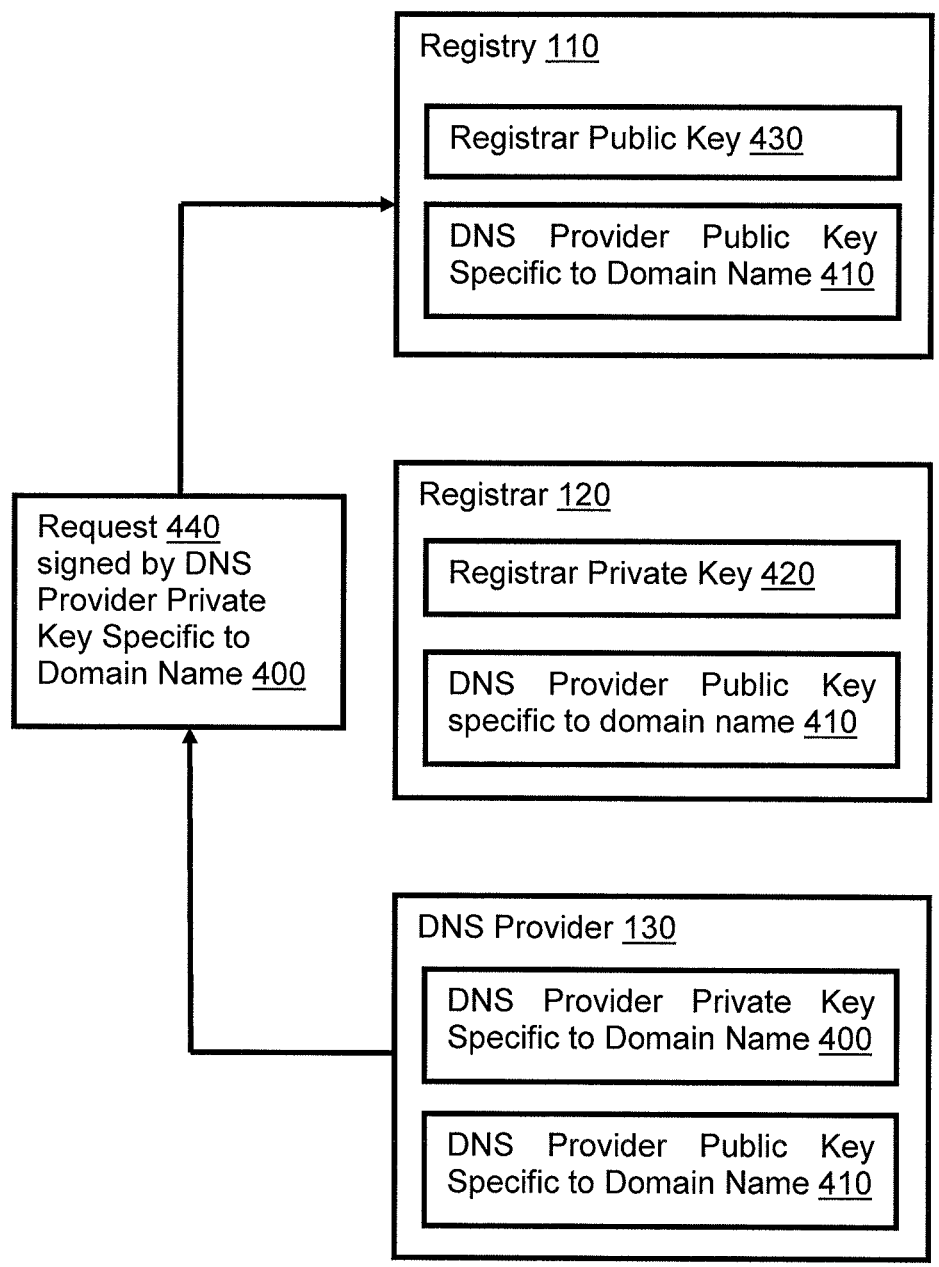
FIG. 4 is an information flow diagram illustrating a method for a registry to confirm that a request regarding a domain name comes from a DNS provider that has control over the domain name.

FIG. 4 illustrates one method for a registry 110 to confirm that a message received to update a DS record 114 for a domain name in the DNS root zone 112 was from a DNS provider 130 that has legitimate control over the domain name. The DNS provider 130 may store a DNS provider public key specific to a domain name 410 in a location that confirms the DNS provider 130 has control over the domain name 113. The DNS provider 130 may sign the message to update the DS record 114 or other data with the registry for the domain name with the DNS provider or appropriate private key specific to the domain name 400. The DNS provider 130 may transmit the signed message to update the DS record 114 for the domain name directly to the registry 110. The registry 110 may read the DNS provider public key specific to the domain name 410 at the location that confirms the DNS provider has control over the domain name and/or the nameserver 131 for the domain name. The registry 110 may verify the signature of the message to update the DS record 114 using the DNS provider public key specific to the domain name 410. If the registry 110 is able to successfully verify the request 440 using the DNS provider public key specific to the domain name 410, the registry 110 may update the DS record 114 as requested by the DNS provider 130. If the registry 110 is not able to successfully verify the request 440 using the DNS provider public key specific to the domain name 410, the registry 110 preferably ignores the request 440. Similarly other changes from the DNS Provider to the registry can be enabled by signing the request with the appropriate key. This might be updating NS records or other data as enabled.

Figure 5:
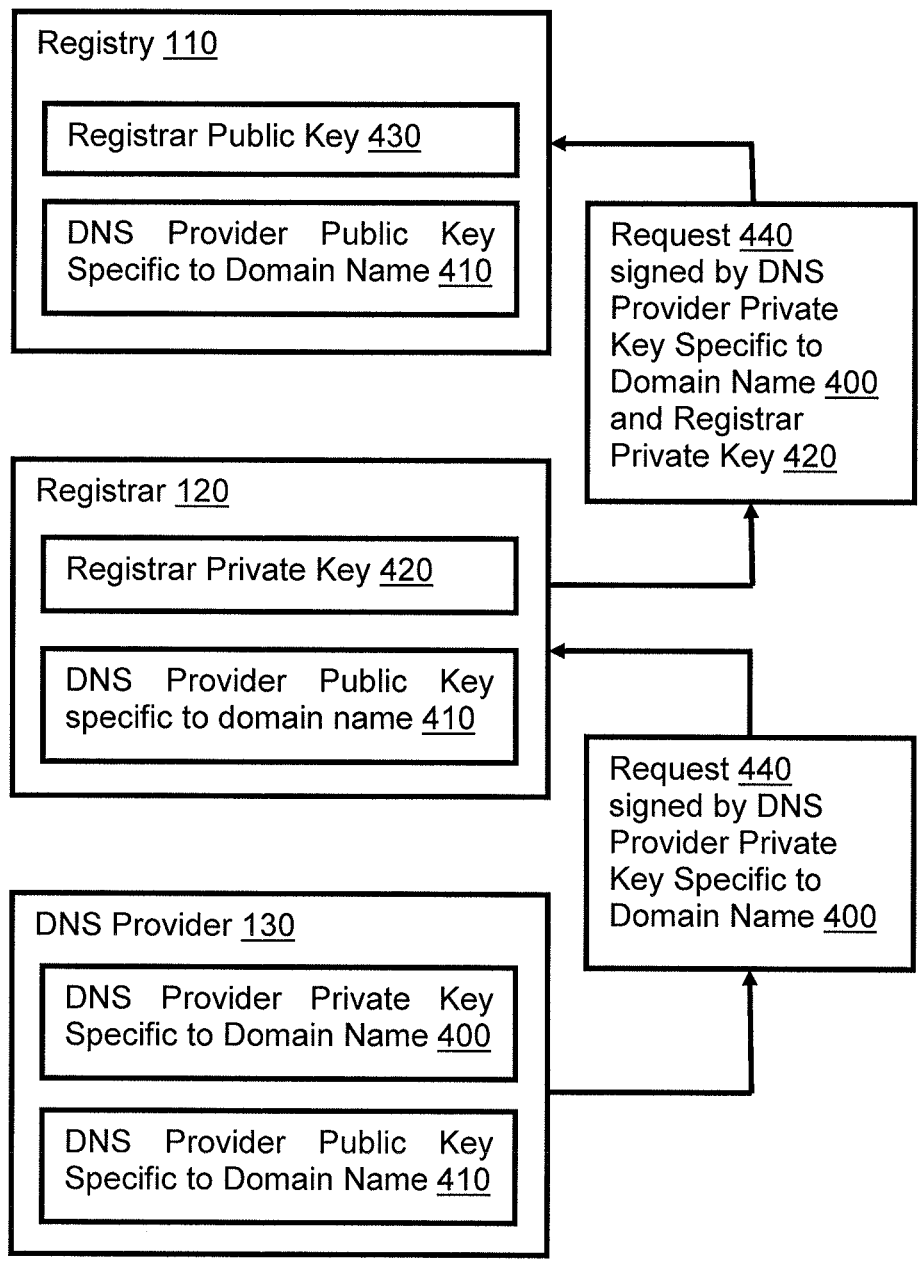
FIG. 5 is another information flow diagram illustrating another method for a registry to confirm that a request regarding a domain name comes from a DNS provider that has control over the domain name.

FIG. 5 illustrates another method for a DNS Provider to update data at the registry 110. The registry 110 may confirm that a message received to update a DS record 114 for a domain name in the DNS parent zone 112 was from a DNS provider 130 that has legitimate control over the domain name. The DNS provider 130 may store a DNS provider public key specific to a domain name 410 in a location that confirms the DNS provider 130 has control over the domain name 113 and/or a nameserver 131 for the domain name 113. The DNS provider 130 may sign the message to update the DS record 114 for the domain name with the DNS provider private key specific to the domain name 400. The DNS provider 130 may transmit the signed message to update the DS record 114 for the domain name to a registrar 120. The registrar 120 may track the request and verify the requests authenticity. After verification, the registrar can update the DS record or other data with the registry, as the registrar has rights to do so. The registrar 120 may sign the request 440 with a registrar private key 420. The registrar may transmit the request 440 now signed by the DNS provider (using the DNS provider private key specific to the domain name 400) and signed by the registrar 120 (using the registrar private key) to the registry 110. The registry 110 may read the DNS provider public key specific to the domain name 410 at the location that confirms the DNS provider has control over the domain name and/or the nameserver 131 for the domain name and the registrar public key 430. The registry 110 may decrypt the message to update the DS record 114 using the registrar public key 430 and the DNS provider public key specific to the domain name 410. If the registry 110 is able to successfully decrypt the request 440 using the registrar public key 430 and the DNS provider public key specific to the domain name 410, the registry 110 may update the DS record 114 as requested by the DNS provider 130 via the registrar 120. If the registry 110 is not able to successfully decrypt the request 440 using the registrar public key 430 and the DNS provider public key specific to the domain name 410, the registry 110 preferably ignores the request 440.

Upon the registrar 120 or the registry 110 verifying the encrypted request was signed by the private key of the DNS provider 130, the registry 110 may update the DS record 114 in the DNS parent zone 112 to enable the domain name 113 to support DNSSEC. (Step 320) If the registrar 120 or the registry 110 is not able to verify the encrypted request was signed by the private key of the DNS provider 130, the request is ignored and the DS record 114 is not updated. If the DS record 114 was updated to enable the domain name 113 to support DNSSEC, the registrant 100 may start using the features enabled by DNSSEC now supported by the domain name 113.

In another embodiment, rather than publishing the data in the zone, a key may be published in the zone that is used to sign the data to the parent. One advantage of the present invention is that it allows for utilizing the nameserver as a publishing/bootstrapping mechanism. In another embodiment, the DS values are published in zones.

In another embodiment, the public keys are published in zones and the DS values are sent and signed by the key published in the zone. This would enable two types of the API to the parent registry. One signs data with a public key in the zone of the domain while the other signs data with a public key in the zone of the nameserver.

To establish DNS Sec initially in the zone, the first DS record may need to be pushed to the parent zone. But without DNS Sec established, it may be difficult to know how if it can be trusted. Because the nameserver for the domain is established (e.g. ns01.domaincontrol.com), if domaincontrol.com has DNS Sec enabled by the DNS Provider, the registrar may publish a public key. The domain foo.com with the nameserver set to ns01.domaincontrol.com can tell the registry "hey . . . here is my initial DS value to publish . . . and it is signed by the private key for domaincontrol.com so you can trust it". Subsequent updates can say "hey . . . here is an updated DS value to publish . . . and it is signed by the private key placed in my zone proper". In different embodiments, either the zone or the nameserver may publish the public key of the signing private key.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method, comprising the steps of:
receiving by a Domain Name System (DNS) provider comprising a nameserver a request for a domain name registered to a registrant to support Domain Name System Security Extensions (DNSSEC), wherein the DNS provider is not a registrar of the domain name;
signing with a private key of the DNS provider an instruction to update a Delegation Signer (DS) record in a DNS parent zone controlled by a registry to enable the domain name to support DNSSEC; and
transmitting by the DNS provider over an Application Programming Interface (API) the signed instruction to the registry, wherein the registry is configured to verify with a public key of the DNS provider the signed instruction and the registry is configured upon verifying the signature to update the DS record in the DNS parent zone to enable the domain name to support DNSSEC.

2. The method of claim 1, further comprising the step of:
storing by the DNS provider the public key in a DNS zone file for the domain name.

3. The method of claim 2, further comprising the step of:
reading by the registry the public key in the DNS zone file for the domain name.

4. The method of claim 1, further comprising the step of:
storing by the DNS provider the public key in a DNS zone file for the domain of the nameserver.

5. The method of claim 4, further comprising the step of:
reading by the registry the public key in the DNS zone file for the parent domain of the nameserver of the DNS provider.

6. The method of claim 1, further comprising the step of:
receiving by the DNS provider a digital certificate from the registrar of the domain name, wherein the digital certificate comprises the private key and the public key.

7. The method of claim 1, wherein the public key and the private key are associated and used only with the domain name and the public key and the private key are not associated or used with any other domain names.

8. A method, comprising the steps of:
receiving by a Domain Name System (DNS) provider comprising a nameserver a request for a domain name registered to a registrant to support Domain Name System Security Extensions (DNSSEC), wherein the DNS provider is not a registrar of the domain name;
signing with a private key of the DNS provider a first instruction to update a Delegation Signer (DS) record in a DNS parent zone controlled by a registry to enable the domain name to support DNSSEC; and
transmitting by the DNS provider over an Application Programming Interface (API) the first instruction to the registrar, wherein the registrar is configured to verify with a public key of the DNS provider the first instruction and the registrar is configured upon verifying the first instruction was encrypted by the DNS provider to transmit a second instruction to the registry to update the DS record in the DNS parent zone to enable the domain name to support DNSSEC.

9. The method of claim 7, further comprising the step of:
storing by the DNS provider the public key in a DNS zone file for the domain name.

10. The method of claim 9, further comprising the step of:
reading by the registrar the public key in the DNS zone file for the domain name.

11. The method of claim 8, further comprising the step of:
storing by the DNS provider the public key in a DNS zone file for the nameserver of the domain.

12. The method of claim 11, further comprising the step of:

reading by the registrar the public key in the DNS zone file for the nameserver of the domain.

13. The method of claim 8, further comprising the step of:

receiving by the DNS provider a digital certificate from the registrar of the domain name, wherein the digital certificate comprises the private key and the public key.

14. The method of claim 8, wherein the public key and the private key are associated and used only with the domain name and the public key and the private key are not associated or used with any other domain names.

15. A method, comprising the steps of:

registering by a registrar a domain name to a registrant;

storing by a Domain Name System (DNS) provider, that is not the registrar of the domain name, the domain name in a nameserver controlled by the DNS provider;

signing with a private key of the DNS provider a request to update a Delegation Signer (DS) record in a DNS root zone controlled by a registry to enable the domain name to support Domain Name System Security Extensions (DNSSEC);

transmitting by the DNS provider over an Application Programming Interface (API) the signed request to either the registrar or the registry;

verifying by the registry or the registrar with a public key of the DNS provider the signed request;

verifying by the registry or the registrar that the signed request was signed by the DNS provider; and upon the registry or the registrar verifying the request was signed by the DNS provider, updating by the registry the DS record in the DNS root zone to enable the domain name to support DNSSEC.

16. The method of claim 15, further comprising the step of:

storing by the DNS provider the public key in a DNS zone file for the domain name.

17. The method of claim 16, further comprising the step of:

reading by the registry or the registrar the public key in the DNS zone file for the domain name.

18. The method of claim 15, further comprising the step of:

storing by the DNS provider the public key in a DNS zone file for the nameserver of the domain.

19. The method of claim 18, further comprising the step of:

reading by the registry or the registrar the public key in the DNS zone file of the nameserver of the domain.

20. The method of claim 15, further comprising the step of:

receiving by the DNS provider a digital certificate from the registrar of the domain name, wherein the digital certificate comprises the private key and the public key.

* * * * *